May 3, 1955 J. E. VISTAIN, JR 2,707,639

PHONOGRAPH RECORD PLAYER CONTROL

Filed Feb. 13, 1951 4 Sheets-Sheet 1

INVENTOR.
James E. Vistain Jr.
BY
J. W. Douglas
His Atty

May 3, 1955 J. E. VISTAIN, JR 2,707,639

PHONOGRAPH RECORD PLAYER CONTROL

Filed Feb. 13, 1951 4 Sheets-Sheet 2

INVENTOR.
James E. Vistain Jr.
BY
J. W. Douglas
His Atty.

May 3, 1955 — J. E. VISTAIN, JR — 2,707,639

PHONOGRAPH RECORD PLAYER CONTROL

Filed Feb. 13, 1951 — 4 Sheets-Sheet 3

INVENTOR.
James E. Vistain Jr.
BY
J. W. Douglas
His Att'y.

PHONOGRAPH RECORD PLAYER CONTROL

Filed Feb. 13, 1951

INVENTOR.
James E. Vistain Jr.
BY
J. W. Douglas
His Att'y

United States Patent Office 2,707,639

Patented May 3, 1955

2,707,639

PHONOGRAPH RECORD PLAYER CONTROL

James E. Vistain, Jr., Chicago, Ill., assignor to Admiral Corporation, Chicago, Ill., a corporation of Delaware Application February 13, 1951, Serial No. 210,681

3 Claims. (Cl. 274—10)

This invention relates to improvements in phonograph record players for reproducing a group of records delivered in one-by-one order to a turntable from a magazine, and especially to a control device adapted to stop the record player automatically when the last record from the magazine has been reproduced.

Among the improvements incorporated in the present invention are those which afford convenience of repair or adjustments of the same and which provide for economy of manufacture.

Other advantages of the invention will be set forth in part hereinafter and in part will be obvious herefrom, or may be learned by practice with the invention, the same being realized and attained by means of the instrumentalities and combinations pointed out in the appended claims.

In the drawings:

Fig. 4 is a fragmentary vertical section on line 4—4 of Fig. 3;

Figure 2:
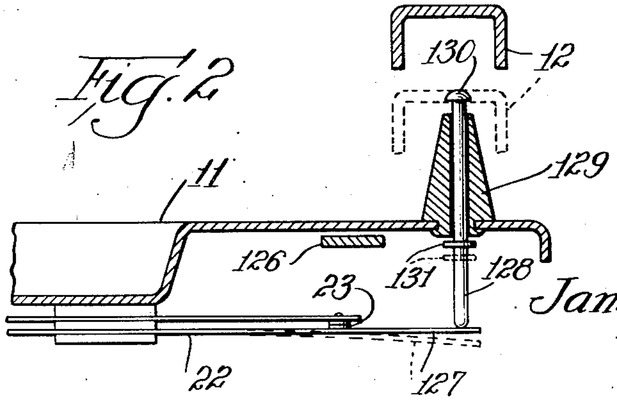
Fig. 2 is a vertical section on line 2—2 of Fig. 1, the alternative position of certain of the parts being shown by dotted lines.

Although the invention is susceptable of adaptation to other record players, I prefer to illustrate its novel features as combined with the record player disclosed in my copending application filed on May 11, 1950, Ser. No. 161,370. The mechanism of this machine includes a base plate 11, from which is supported a pickup arm 12, turntable 13 and ejector mechanism 14. The turntable 13 includes a peripheral depending flange 16 in driven association with a floating idler wheel 17, an element of a motor drive unit 18. Preferably, the motor drive unit 18 is of the class which is adapted to operate the turntable at a plurality of speeds and is supported from the base plate 11 at an aperture 19 therein. The unit 18 also includes a motor 21 which is in an electrical circuit with a normally closed switch 22 (Fig. 2) which may be of the leaf spring variety having contacts 23 and supported from the base plate 11. Means by which the switch may be manipulated for starting and stopping the record player will be described hereinafter.

The speed of turntable 13 may be changed by rotation of a manual control knob 24 (Fig. 1) to move a motor set cam 24 and through it the motor set link 26 and a motor set arm 25 (Fig. 3) in accordance with the disclosure previously referred to.

The mounting for the pickup arm 12 includes a base pedestal 27 (Fig. 4), on the base plate 11, and within the pedestal a vertical bushing 28 in which a sleeve 29 is rotatably journalled. The upper end of the sleeve 29 carries a lower member 31 by means including a head 32. An upper member 33 is provided on the pickup arm 12, the upper and lower supports having ears which are pivotally connected by a pin 34 to provide a horizontal axis about which the arm 12 rocks. This rocking operation is performed by means including a lift pin 36, slidably journalled in the sleeve 29. The pin 36 is moved by cam surface 37 formed on a plate 38, the plate being adapted to be swung horizontally about a pivot 39 (Fig. 3) on the base plate 11. The pickup arm 12 is adapted to be swung laterally carrying with it a crank arm 40 which extends laterally from the lower end of sleeve 29. The crank arm has an abutment member, contactor or follower 35 at the end.

Figure 5:
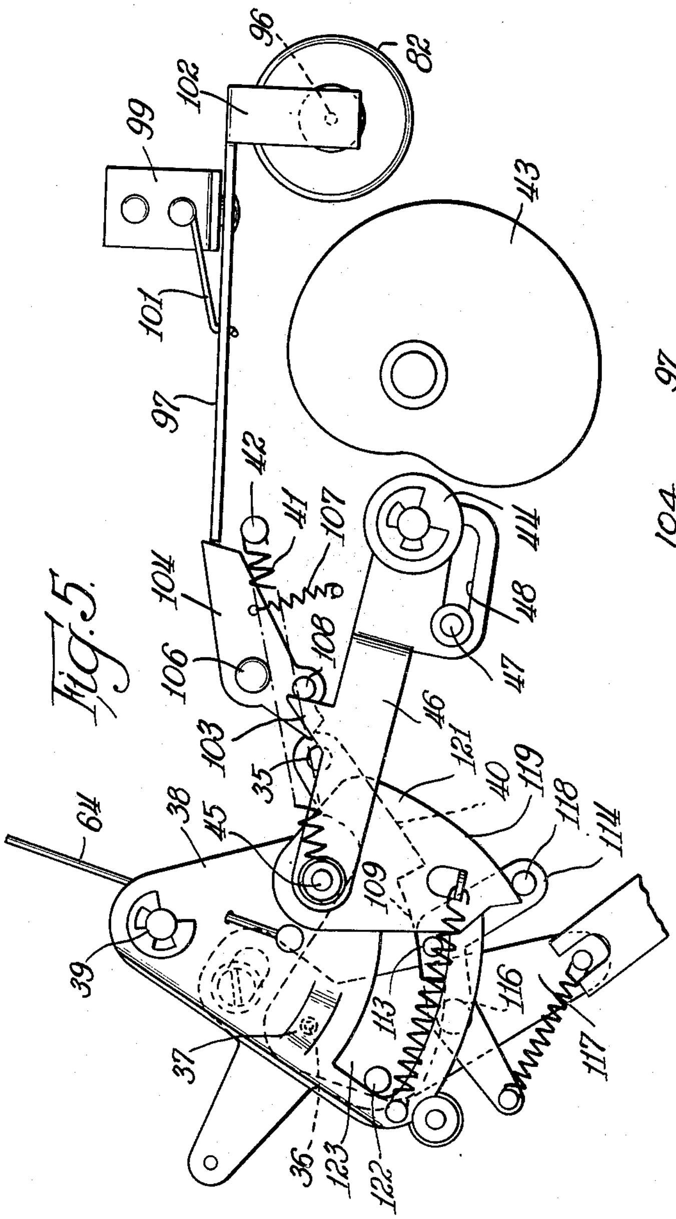
Fig. 5 is a fragmentary view of parts indicated in Fig. 3 disassociated from other parts of the record player, the same being drawn to an enlarged scale and shown in a different position.

The cam pivot 39 (Fig. 5) is spaced from the axis of the lift pin 36 so that cam surface 37 is adapted to be carried through an arc thereunder. Outward motion of the plate 38 is resisted by a tension spring 41, anchored between a pin 45 on plate 38 and the base plate 11. This motion is imparted to the plate, however, by cyclically operating mechanism including a turntable driven main cam 43 adapted to be driven through a single revolution only by means later to be referred to. Whenever the main cam 43 rotates through a cycle, its periphery engages a follower 44 on a link 46. The link 46 is connected to plate 38 by the pin 45 and said plate is swung through a predetermined arc in a clockwise direction by the link 46. The plate 38 is then swung counterclockwise through the same arc by the spring 41 when the link 46 is retracted. During operation, the link 46, and hence follower 44, is guided partly by a stud 47, on the base plate 11, which extends through a slot 48 in the link 46.

The cam 43 is driven by a mutilated gear 49 which is cooperatively associated with a pinion 51 (Fig. 1) on the hub 52 of the turntable 13. During the playing of a record, a blank space 53, in the periphery of gear 49, is held opposite the pinion 51, the gear being held stationary by a spring-pressed latch lever 54, on the base plate 11, which engages a pin 56, on the gear 49. When the inward motion of the pickup arm 12 exceeds the normal rate at which it is tracking a record which runs when it reaches the trip groove of the record, an abutment lug 57 on the end of a trip lever 58 pivoted at 59 to gear 49 is moved into the path of a striker lug 61, on the turnable hub 52. The striker 61 engages the lug 57 and moves the gear sufficient to turn it into driving relationship to the pinion, resulting in the cam 43 being rotated through one complete revolution. At the end of the revolutions, the blank space 53 is returned to its former position opposite the pinion 51 where it is held by the member 54.

The accelerated movement of the pickup arm 12 at the end of the playing of a record is communicated from the sleeve 29, rotated by the pickup arm, to the lever 40 which carries the pin 35. The pin 35 is carried into engagement with the hook on the end of the link 67 (Fig. 3) and this link is slid outward by the contact to bring the pin 68, on its inner edge, into engagement with the arm of the lever. The lever is in frictional engagement with the lever on dog 58 and is rotated by the lever 63 to bring the dog 57 into the path of the striker arm. When the cam plate 38 is returned to its normal position, the spring rod 64 on the plate engages the pin 66 on the slide 67 and pushes the slide back to its original position.

Other mechanism associated with main cam 43 includes an ejector operating lever 69 pivoted at 71 to the base plate 11. In one end thereof, the lever 69 has a slot 72 in which is received a pin 73 carried by the cam 43 so that when said cam is operated and the lever 69 is moved, another pin 74, carried at the other end of lever 69, will cooperate with a lever 76 for actuation of the ejector mechanism 14. Although the intricacies of construction of the ejector mechanism 14 will not be described since its structure and function have been set forth in the application aforesaid, it should be stated that the ejector head is adapted to provide support for records of common size in stacks differing in diameter while the records of the stack are concurrently supported at their center holes by a spindle 77 (Fig. 4). In order that 7-inch, 10-inch and 12-inch diameter records in stacks may be accommodated by the mechanism 14, retractable support surfaces 78, 79 and 81 are provided by the means alluded to.

The support for the spindle 77 (Fig. 4) is coaxial with the turntable 13 and includes a housing member 82 rigidly attached to base plate 11. Member 82 is recessed annularly at 83 to receive a ball bearing 84 on which the turntable hub 52 rests, an annular vibration insulation washer 86 being employed below the ball bearing if desired.

The hub 52 of the turntable is journalled on a sleeve 87 extending axially of the recess 83. Means to lock the spindle 77 against forces tending to dislodge it axially of the sleeve 87 may include any suitable snap fasteners 88 and 89, on the spindle and in intimate association with the respective ends of said sleeve.

Figure 1:
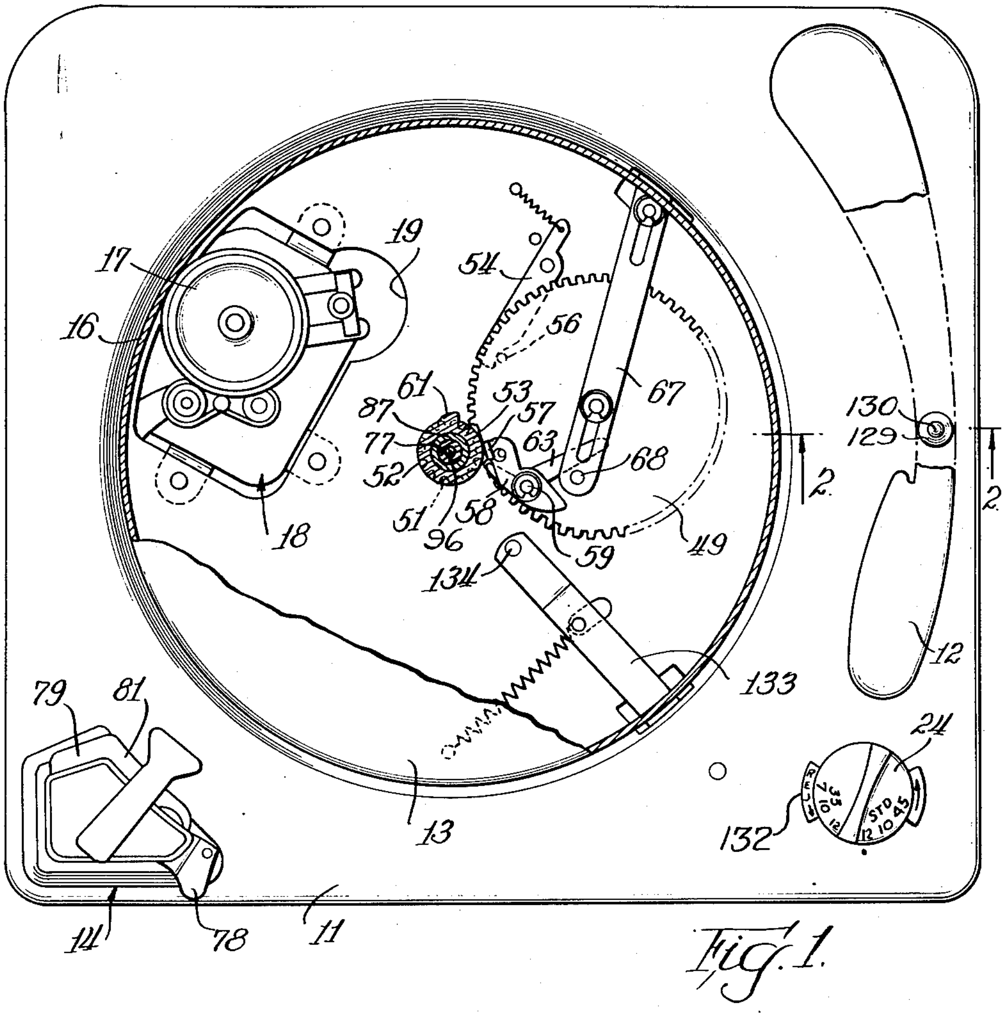
Fig. 1 is a top plan view of a record player in which the invention is embodied with certain parts broken away to more clearly show parts that would otherwise be hidden.

As will be noted (Fig. 4), the spindle 77 includes at the top thereof a pilot portion 91 which extends through the center holes of a stack of records while the same is supported by an appropriate one of the support surfaces 78, 79 or 81 (Fig. 1). The pilot portion 91 is offset from the remainder of the spindle thereby providing a shoulder 92 on which the records are adapted to normally rest. In so doing, the records above the bottom record, are restrained from displacement from shoulder 92 by a vertically slidable member 93 in accordance with the teachings of the patent to Faulkner, No. 2,498,333. From the shoulder 92 downward throughout the remaining length of the spindle extends a bore 94 in which is slidably accommodated a detector rod 96. The rod 96 is adapted to be displaced axially when one or more records are positioned on the shoulder 92 and/or when the weight of the records on said shoulder has been removed.

Mechanism to provide upward displacement of the rod 96 includes a latch or stop lever 97 pivoted at 98 to a bracket 99 on the base plate 11. Also attached to the bracket 99 is a spring 101 adapted to engage the lever 97 and bias it clockwise (Fig. 4) about its pivot. Although due to gravity the rod 96 is adapted to be constantly in engagement with a stirrup or lug 102 extending under said rod from the lever 97, the force of the spring 101 is adequate to lift the rod 96 to an upper position when no record is on the spindle shoulder 92. The position then assumed by lever 97 is indicated by broken lines. When in this position, the upper end of rod 96 extends above the shoulder 92. When, however, one or more records are positioned on the shoulder 92, its or their weight is adequate to depress the rod against the force of spring 101 so that the upper extremity of the rod is flush with the level of shoulder 92 and concurrently the lever 97 is maintained in its full line position.

In order to understand the function of the stop lever 97, it should be noted (Fig. 5) that a lug 103 extends from the side of the link 46. A latch lever or interlocking element 104 is pivoted at 106 to the base plate 11 in position adjacent the lug 103. A pin 108 on this lever is thus in position to be engaged by the lug, and this engagement is induced by a small tension spring 107. During playing of a record, the pin 47 engaging one end of slot 48 is adequate to overcome the tension of spring 41, and spring 41 is of sufficient strength to overcome the force of a smaller spring 107. It is apparent that the lug 103 will be carried away from the pin 108 when cam 43 is rotated through a cycle. During this operation, the lever 97 is adapted to cooperate with the element 104. For so doing, that end of lever 97 which is most remote from the axis of the turntable is disposed in close proximity to the lever 104 so that when the lever 97 is in its full line position (Fig. 4), it affords a stop to resist rotation of the element 104 during cyclic operation of the record player. When, however, the lever 97 is in its broken line position, the element 104 is free to be turned by spring 107 whenever the link 46 and the lug 103 are moved cyclically.

Figure 6:
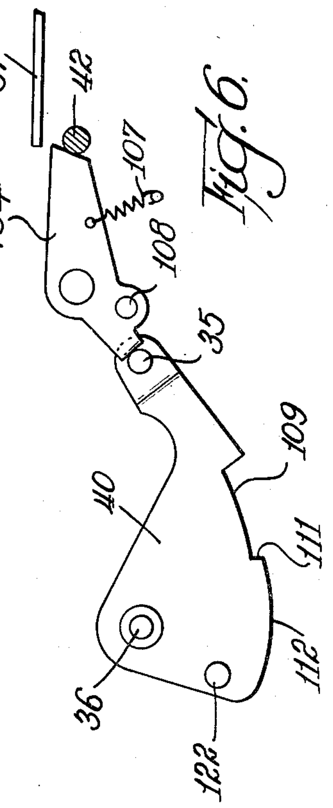
Fig. 6 is a view of some of the parts shown in Fig. 5, the same being depicted in different positions of their operation.

As previously indicated, the contactor member 35 is adapted to be carried through a predetermined course by the pickup arm 12. As long as lever 104 is engaged by either the lever 97 or the lug 103, the lever 104 is out of the course through which the contactor moves. When, however, it is disengaged from both the lug 103 and the stop lever 97, the interlocking element 104 is swung by spring 107 into the course through which the contactor 35 is carried. The element 104 is stopped in that position by the pin 42 (Fig. 6).

During cyclic motion of the cam 43, the crank arm 40 on the sleeve 29 is swung clockwise (Fig. 5) against spring pressure. This can best be understood from Fig. 6 wherein it will be noted that arm 40 is provided with a first cam 109 which extends in a spiral direction about the axis of the lift pin 36 from a positioning shoulder 111. Also extending in a spiral direction about the axis of pin 36 from shoulder 111, but in offset relation to the first cam 109, is a second cam surface 112 on the edge of the crank arm 40. For cooperation with the cams 109 and 112, a positioning follower 113 (Fig. 5) is carried by a lever 114 biased counterclockwise about a pivot 116 by which the lever is fastened to a carrier arm 117. During record playing, the follower 113 is held out of engagement with the cams 109 and 112 by engagement of a pin 118, on one of the ends of lever 114, with a cam surface 119 at the edge of an arm 121. This arm is spring biased clockwise about a fulcrum pin 45 so that arm 40 may be moved freely by the pickup arm when tracking a record. When cyclic operation of the cam 43 is initiated, the cam surface 119 is carried away from pin 118 and the follower 113 is allowed to move into engagement with the cam 112. The vertically effective cam 37 is carried under lift pin 36 to free the pickup arm from the record it is tracking. Sequentially, a stud 122 carried by the crank arm 40 and extending through a slot 123 in the plate 38 is engaged by the arm 121 to swing crank arm 40 clockwise, and consequently, the pickup arm outward to its outermost position. After the highest portion of the cam 43 has passed the follower 44 and the direction of rotation of plate 38 has been reversed, the force of follower 113 against cam 109 causes the crank arm 40 to swing counterclockwise, the follower sliding over the cam until the shoulder 111 is engaged by said follower. This engagement takes place during the inward motion of the pickup arm at a point when said arm is above the beginning of the sound groove of a record about to be reproduced and commonly referred to as the let-down point.

Provision for let-down of the pickup arm at other points is made by swinging the carrier arm 116 to other predetermined angular positions about the axis of the lift pin 36. This is carried out manually by turning the knob 24, (Fig. 1), motion therefrom being communicated by means including a cam 124 (Fig. 3) and lever 126 to the arm 117. Concurrently, on engagement of the follower 113 by the shoulder 111, the lift pin 36 is lowered by the cam 37. This is the normal sequence of operations between consecutive reproduction of records.

An operation, differing from those already described, takes place when reproduction of the last record from the spindle shoulder 92 is discontinued. As has already been indicated the interlocking element 104 is swung by spring 107 until a portion thereof is in the course of the contactor, when said element is released by both stop members 97 and 103. The engagement of contactor 35 by the interlocking element 104 takes place when the pickup arm is in its outermost position, or nearly so, and is adequate to effectively resist movement of the pickup arm inwardly therefrom. Although the crank arm 40 is so detained, the plate 38 continues its inward motion during which the vertically effective cam 37 is carried under the lift pin 36 to lower the pickup arm now at its outermost position.

A lower leaf 127 (Fig. 2) of the switch 22 extends beyond the contacts 23 and is engaged by an actuator pin 128 slidably journalled in a bearing 129 on the base plate 11. The leaf 127 is adequately resistant to the weight of the pin 128 during record playing to maintain contacts 23 in engagement with each other. However, when the pickup arm is lowered in its outermost position it engages the pin 128 which is thereby depressed against the resistance of the leaf 127 and the switch 22 is opened, thus opening the motor circuit and stopping the motor. To limit its axial movement, the pin 128 is provided with a head 130 at its upper end and a collar 131 below the level of the base plate 11.

In order to start the motor 21, the pickup arm 12 is lifted from the support of pin 128 and moved inwardly far enough to avoid resting on the pin again when released. The pin 128 is raised by the leaf 127 to complete the circuit through the contacts 29. The motor may be made to operate the cyclic mechanism by turning a manual reject control 132 (Fig. 1) at the periphery of knob 24 while the pickup arm is thus disengaged from the pin 128. Rotation of the control 132 carries a stud 133′ (Fig. 3) thereon into engagement with a lever 133 rocking it against spring pressure to carry a pin 134 on said lever into engagement with the dog 58 (Fig. 1). This movement swings the dog 58 counterclockwise to provide the cooperation needed with striker 61 to start a cycle. Assuming no record to be present on the turntable when the magazine means is loaded with a stack of records, reproduction thereof may be started by lifting the pickup arm out of engagement with pin 128 and the machine then put in cycle as just indicated to release a record to the turntable after which reproduction of the records will be continued, until the motor 18 is stopped in the manner hereinbefore described.

Figures 3, 7:
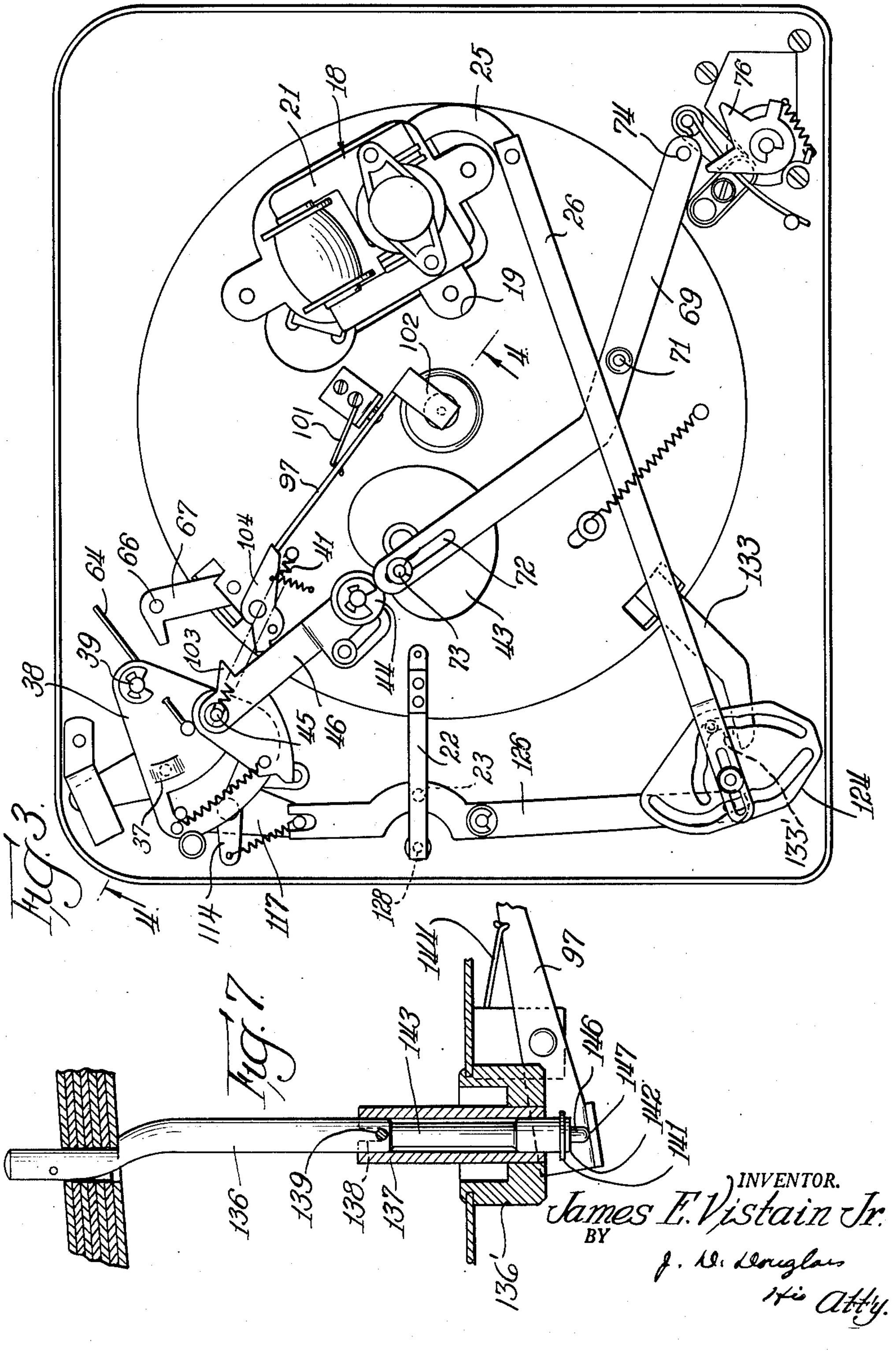
Fig. 3 is a bottom plan view of the record player shown in Fig. 1.
Fig. 7 is a view of a second embodiment of elements of the invention.
Figure 11:
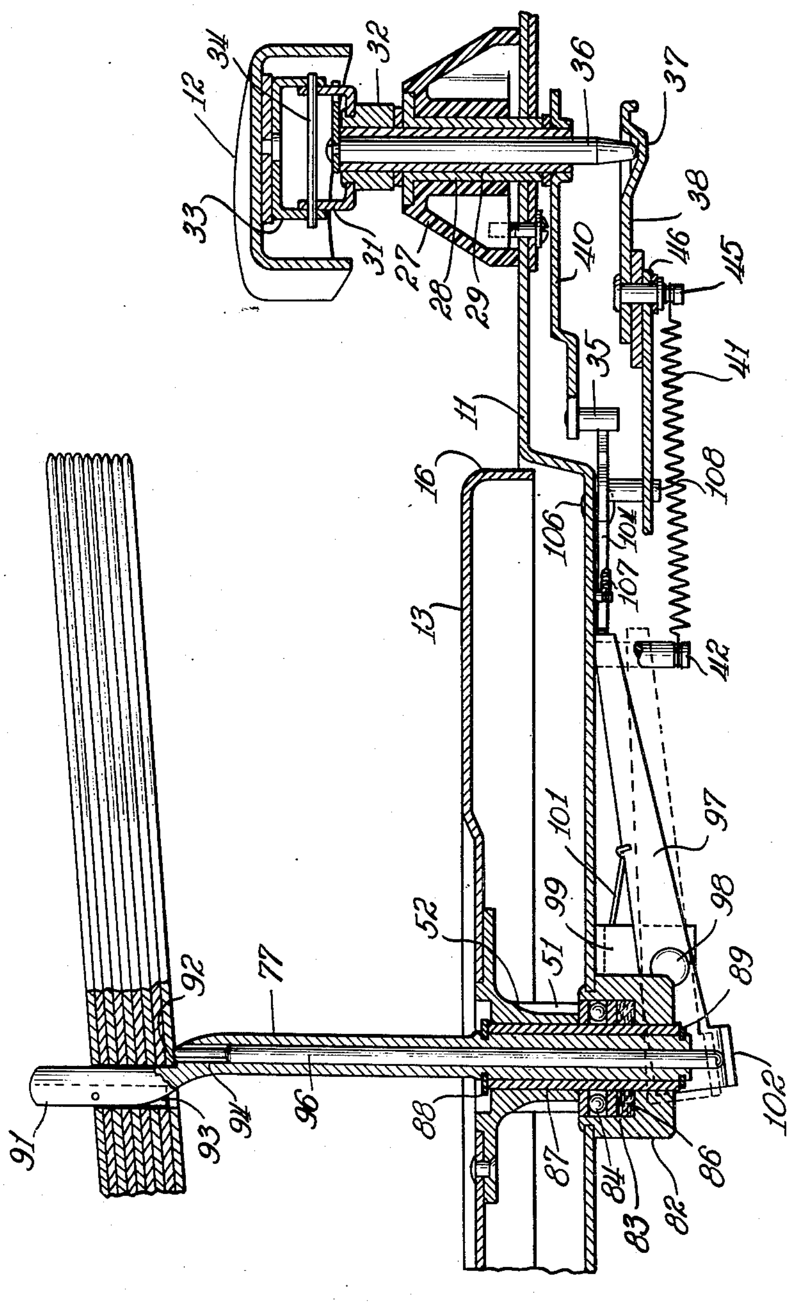

The alternative embodiment of the invention shown in Fig. 7 comprehends use of a solid spindle 136 which, in its entirety, is movable longitudinally thereof to regulate the stop lever 97. In order that this spindle may be so mounted, a bearing 136′, on the base plate 11 is provided with a central bushing 137 within which the spindle 136 is accommodated. The upper end of bushing 137 is formed to provide a pair of slots 138 in which are received the end portions of a cross pin 139 passing transversely of the spindle. During its up and down movement, the pin 139 restrains the spindle from turning so that it is retained in operative position with respect to the ejector mechanism 14. The pin 139, together with a washer 141 and C-washer 142 on the lower end of the spindle retain the spindle in operative engagement with the bushing 137. If desired, a central portion of the spindle within the bushing 137, indicated by 143, may be of reduced diameter to provide room for a supply of lubricant to facilitate movement of the spindle. It is also essential that a spring 144, the counterpart of spring 101 of the previously described mechanism, be sufficiently strong to lift the spindle to an upper position when no record is supported thereby yet sufficiently weak to afford movement of the spindle to the position in which it is indicated when but one record is supported by it. To impart upward force at the axis of the spindle its lower end is of reduced diameter at 146 and preferably convex as at 147.

While I have described my invention in two embodiments thereof, I am aware that numerous and extensive departures may be made therefrom without departing from the spirit or scope of my invention.

I claim:

1. A record player having magazine means for supporting records above a turntable including a spindle having a shoulder thereon for engaging the records adjacent their center holes and a motor drive unit therefor and adapted to discharge the records therefrom onto the turntable and having means for raising, swinging and lowering a tone arm in timed relation to the release of the records to the turntable and including a swingable tone arm and means connecting the swingable tone arm to the motor drive unit, the improvement which comprises, a bore through said spindle the upper end of which opens through said shoulder, a rod disposed in said bore and movable through the hole in the shoulder for engaging the records adjacent their center holes responsive to the weight of one or more records supported on the shoulder, means for engagement with the tone arm connected to and operable by said weight responsive rod, to hold the tone arm in a predetermined position after the weight is removed from the spindle and means disposed in the path of the downward movement of the tone arm when said tone arm is restricted in its movement operable upon lowering the tone arm, and switch means controlled thereby to shut off said motor drive unit.

2. A record player having magazine means for supporting records above a turntable and a motor drive unit therefor and adapted to discharge the records therefrom onto the turntable and having means for raising, swinging and lowering a pickup arm in timed relation to the release of the records to the turntable and including a member swingable with the tone arm for determining the let down position of the tone arm and means connecting the swingable member to the motor drive unit including a slidable member, the improvement which comprises, means associated with the spindle for engaging the records adjacent their center holes, a stop lever pivotally supported in position to engage the swingable member and limit the inward movement of the pickup arm thereby and spring means connected thereto to bias it to a swingable lever engaging position, when the last record has been played, said spindle having a portion responsive to the weight of the records supported thereby, a release lever pivoted below th turntable and disposed in operable engagement with said weight responsive portion, said release lever having a portion in holding engagement with said stop lever to hold said stop lever out of engagement with said swingable member and means on said slidable member for engagement with said stop lever to cyclically move said stop lever out of the path of said swingable member and means disposed in the path of the downward movement of the tone arm when said tone arm is restricted in its inward movement operable upon lowering the tone arm, and switch means controlled thereby to shut off said motor drive unit.

3. A record player including magazine means for supporting a plurality of records above a motor driven turntable and operable to release the records one at a time onto the turntable including a center post for supporting the records at their center and a pickup arm swingable over the turntable, means for shutting off the motor after the last record has been played including a vertically movable rod disposed in said center post which is movable in response to the weight of one or more records resting thereon, a lever engaged with said movable rod and spring bias means connected to the lever to move it and the movable rod vertically when the last record is moved, a second lever engaged and controlled by said first lever arranged to be released upon movement of said first lever, a swingable and elevatable pickup arm and means to raise and swing the pickup arm in conjunction with the release of said records including a lever connected to the pickup arm to control the swinging thereof, said second lever upon being released arranged to engage the lever connected to said pickup arm and restrict the movement of said pickup arm lever and the pickup arm and hold the pickup arm from swinging over the turntable and into position to be lowered to one side thereof, and switch means having an actuating portion disposed under the pickup arm arranged to be engaged thereby upon lowering thereof to operate the switch and shut off the motor.

References Cited in the file of this patent

UNITED STATES PATENTS

| | | |
|---|---|---|
| 2,333,414 | De Tar | Nov. 2, 1943 |
| 2,457,106 | Pressley | Dec. 21, 1948 |
| 2,486,898 | Wennerbo et al. | Nov. 1, 1949 |
| 2,545,643 | Bender | Mar. 20, 1951 |
| 2,577,648 | Dale | Dec. 4, 1951 |

FOREIGN PATENTS

| | | |
|---|---|---|
| 419,299 | Great Britain | Nov. 5, 1934 |
| 112,686 | Sweden | Dec. 12, 1944 |
| 606,458 | Great Britain | Aug. 13, 1948 |